Figure 6:
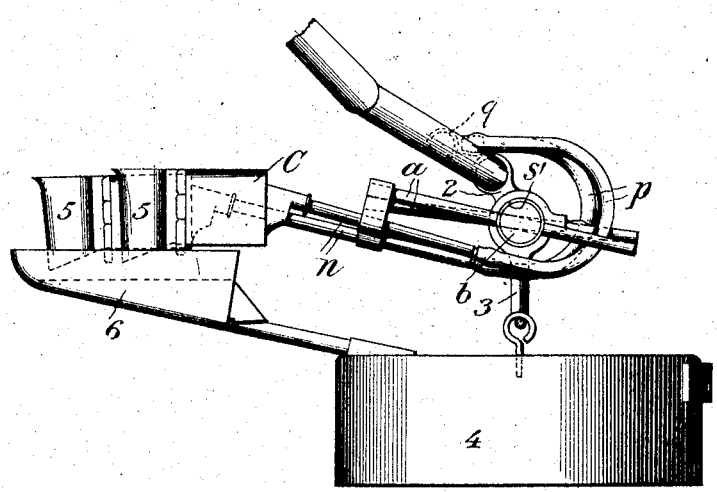

No. 772,421. PATENTED OCT. 18, 1904.
F. LJUNGSTRÖM.
SUPPORT FOR MILKING DEVICES.
APPLICATION FILED MAR. 16, 1904.
NO MODEL. 2 SHEETS—SHEET 1.
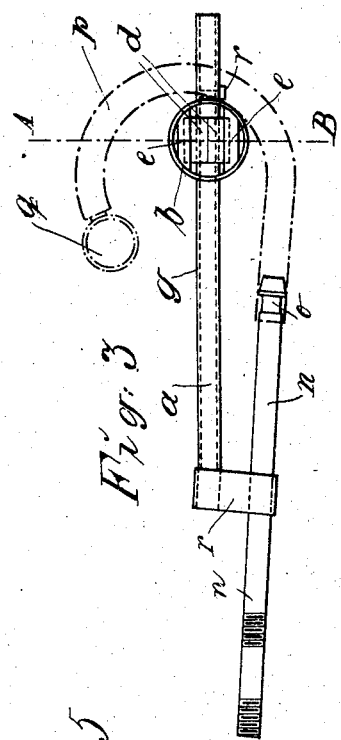
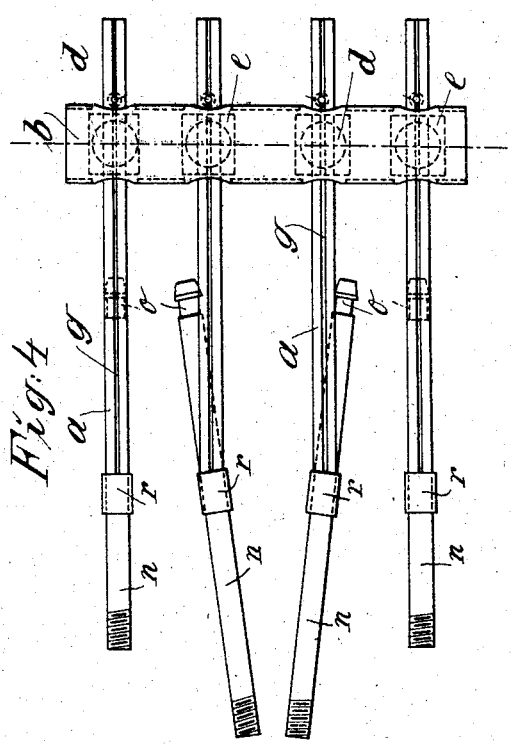
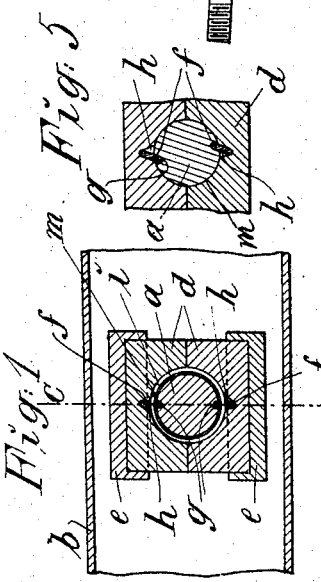
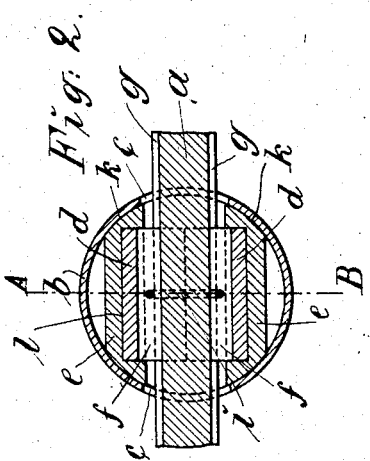
Witnesses:
Inventor:
Fredrik Ljungström
by Henry Orth
Attys No. 772,421. PATENTED OCT. 18, 1904.
F. LJUNGSTRÖM.
SUPPORT FOR MILKING DEVICES.
APPLICATION FILED MAR. 16, 1904.
NO MODEL. 2 SHEETS—SHEET 2.

Witnesses:

Inventor:
Fredrik Ljungström.
by Henry Orth Jr.
Attys.

No. 772,421.

Patented October 18, 1904.

UNITED STATES PATENT OFFICE.

FREDRIK LJUNGSTRÖM, OF STOCKHOLM, SWEDEN.

SUPPORT FOR MILKING DEVICES.

SPECIFICATION forming part of Letters Patent No. 772,421, dated October 18, 1904.

Application filed March 16, 1904. Serial No. 198,443. (No model.)

*To all whom it may concern:*

Be it known that I, FREDRIK LJUNGSTRÖM, a subject of the King of Sweden and Norway, residing at Stockholm, Sweden, have invented certain new and useful Improvements in Supports for Milking Devices; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates to supports and holders for milking devices in which there is a separate device to operate on each teat of the animal, operated by water-pressure, such as described in my application for patent, Serial No. 152,768, filed April 15, 1903.

Referring to the drawings, in which like parts are similarly designated, Figure 1 is a section through one of the bearings and the supporting-rod therein, taken on line A B, Figs. 2, 3, and 4. Fig. 2 is a section on line C D, Fig. 1. Fig. 3 is a side elevation. Fig. 4 is a plan view showing four pipes to which the water-pipes and milking devices are to be attached. Fig. 5 is a section on line A B, Fig. 2, showing the locking device in another position; and Fig. 6 is a side elevation of a milking-machine embodying my invention.

It is desirable to hold the milking devices adjustable to and from one another as well as to and from the holder and at the same time be able to partially rotate them in any direction, so as to maintain a uniform pressure on the teats, this being done by pivoting a universally-adjustable supporting-rod, or it may be the water-pipe itself, and clamping it in the desired position.

I have shown a carrier *b* of tubular form, provided with transverse perforations *c*, through which the supporting members are slidable. Said members may be rods or the union pipe *n* itself. In this tube are upper and lower bearing-blocks *e*, having bearing-surfaces *k*, conforming to the inner surface of the tube *b* and having circular recesses *l*, in which seat upper and lower rotatable elements or cylinders *d*, that preferably, though not necessarily, extend to the medial line of said tube. These cylinders have in their juxtaposed faces a semicircular or other suitably-formed groove *m*, so that when assembled there will be a circular perforation through which a supporting-rod *a* will be slidable, or it may be the union pipe *n* itself. Each cylinder *d* is provided with a V-shaped groove *h*, one wall of which is vertical, as shown, and each rod *a* is provided with diametrically opposite longitudinal grooves *g*, each of which lies opposite a groove *h*. In the grooves *h* and *g* is a locking member *f*, that is prevented from moving longitudinally of the bar by the side walls of the cylindrical recess *h* in the bearing-blocks *e*; but in order to further hold them in place there is a wire ring *i*, passing through both locking members and countersunk in the grooved portion *m* of the cylinders *d*. Depending from the bars *a* are the union pipes *n*, one end of which is threaded to be connected to the milking device and the other end, *o*, formed for the reception of a flexible pipe *p*, connected to a main water-supply *q*. Each rod *a* is provided with a stop *r* to prevent it from being entirely withdrawn from the main tube during adjustment.

It will be observed that the bearing-blocks *e*, which are rotatable in the tube *b*, permit the ends of the rods *a* to be moved vertically, and the cylinders *d*, being rotatable on their vertical axes, permit the rods to be slid through the opening formed by grooves *m* and their ends to be moved laterally, thereby forming a universally-movable support. The rod is thus loose in the grooves *m*, and the locking members *f* are against the inclined wall of the V-shaped groove *h*.

In order to clamp the parts in their adjusted position, it is only necessary to partially rotate the rod *a* from the position shown in Fig. 5 to that shown in Fig. 1, so that the locking members lie against the vertical wall of the grooves *h*. By so doing the locking members *f* are partially rotated on the edges that lie in the grooves *h* and wedge or force the cylindrical blocks *d* apart, which in turn force the bearing-blocks *e* against the tubular carrier *b*. As the locking members are diametrically opposite, the pressure caused through them by the rod $a$ on the coöperating parts is in a straight line in the medial plane of the tube $b$. The parts will remain clamped until released by a partial rotation of the rod $g$ in an opposite direction.

In Fig. 6 I have shown the appliances connected up for use—that is to say, one end of each pipe $n$ $n$ is connected by flexible pipes $p$ $p$ to the pipe $q$, leading to the pump, while the other end of each pipe $n$ is connected to the chambers C, containing the milking-pistons, as described in my application hereinabove referred to. The carrier-tube $b$ has a ring or sleeve $s'$, having an eye 2 to connect said carrier to the harness on the cow, as shown in my copending application, Serial No. 198,444, of even date with this. The ring or sleeve $s'$ has a depending arm 3, to which the milk-receiver 4 is hooked, and below the teat-holders 5 is arranged a collector 6, having a delivery-spout to conduct the milk into the receiver 4.

Having thus described my invention, what I claim as new therein, and desire to secure by Letters Patent, is—

1. In a device such as described, a carrier, a supporting member slidable through the carrier, elements between the carrier and supporting member to permit universal movement of the latter and locking members coöperating with the supporting member and elements to force said elements against the carrier, substantially as described.

2. In a device such as described, a tubular carrier, oppositely-situated bearing-blocks rotatable therein, a supporting member passing between the bearing-blocks and through the carrier, elements between the supporting member and bearing-blocks rotatable about an axis at right angles to that of said carrier and locking members coöperating with the elements and said supporting member to rigidly lock all the parts together, substantially as described.

3. In a device such as described, a tubular carrier, oppositely-situated bearing-blocks having circular recesses, cylinders in said recesses each provided with a groove in one end, a supporting-rod passing through said grooves and a locking member between the rods and each cylinder, whereby a partial rotation of the rod will lock the parts rigidly together, substantially as described.

4. In a device such as described, the combination with a tubular carrier, oppositely-situated bearing-blocks having cylindrical recesses and faces coöperating with the carrier, cylinders in said recesses, having a groove in one of their faces, and a V-shaped groove in the grooved portion, a rod having diametrically opposite grooves between oppositely-situated cylinders, and a locking-bar in each groove in said rod and a V-shaped groove, substantially as described.

5. In a device such as described, a tubular carrier, oppositely-situated bearing-blocks, rotatable therein, a rod between the bearing-blocks, elements between the rods and bearing-blocks, oppositely-situated locking members between the rod and elements and held in position by the bearing-blocks to lock the parts rigidly together, substantially as described.

6. In a device such as described, a tubular carrier, oppositely-situated bearing-blocks rotatable therein, a rod between the blocks, elements between the rod and blocks and rotatable in the latter, a locking member between the rod and elements to rigidly lock the parts together, and a retaining-ring surrounding the rod and passing through the locking members, substantially as described.

7. In a device of the class described, a tubular carrier having oppositely-situated perforations, bearing-blocks in said carrier having cylindrical recesses, cylinders in the recesses having a diametrical groove in one end, a V-shaped groove in the grooved portion of each cylinder, a rod having diametrically opposite grooves passing through the perforations in the carrier and between the cylinders, a locking-bar in each groove in the rod extending into a V-shaped groove, a ring to retain the locking-bars in position and a stop on the bar, substantially as described.

In testimony that I claim the foregoing as my invention I have signed my name in presence of two subscribing witnesses.

FREDRIK LJUNGSTRÖM.

Witnesses:
   TH. WAWRINSKY,
   L. KALLENBERG.